(No Model.)
P. ROTERMUND.
WRENCH.
No. 265,445. Patented Oct. 3, 1882.
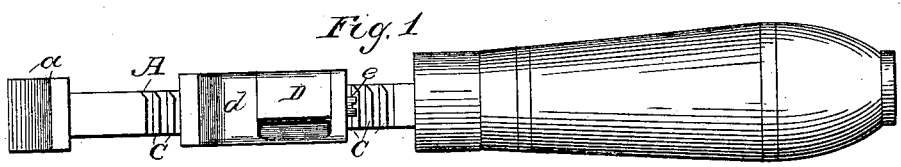
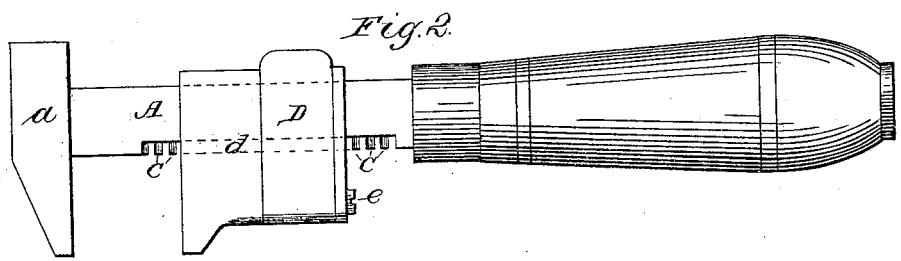
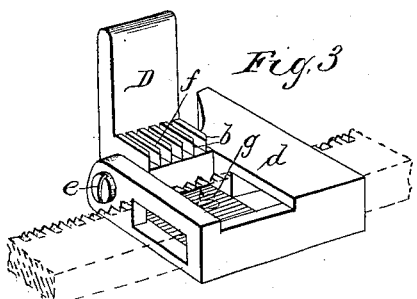
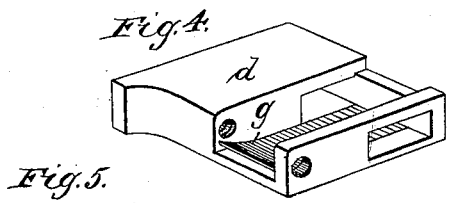
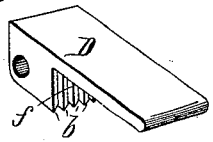
WITNESSES
Chas. Mercer
Jas. A. Baxter
INVENTOR
Peter Rotermund
By Myers
ATTORNEY

United States Patent Office.

PETER ROTERMUND, OF EUREKA, CALIFORNIA.

WRENCH.

SPECIFICATION forming part of Letters Patent No. 265,445, dated October 3, 1882.

Application filed April 24, 1882. (No model.)

*To all whom it may concern:*

Be it known that I, PETER ROTERMUND, a citizen of the United States, residing at Eureka, in the county of Humboldt and State of California, have invented certain new and useful Improvements in Wrenches, of which the following is a specification, reference being had therein to the accompanying drawings.

My invention relates to an improvement in wrenches; and it consists in the serrated bar A, having beveled teeth C, and sliding jaw $d$, having the adjustable serrated clutch D, and in the combination and arrangement of the parts, as hereinafter more fully shown and described.

In the drawings, Figure 1 is a plan view. Fig. 2 is a side elevation, and Figs. 3, 4, and 5 are detail views.

The serrated bar A has rigidly secured thereto the hammer-head jaw $a$, which admits the device being also employed as an ordinary hammer, and its teeth C, which are separated by grooves extending entirely across the face of the bar, are beveled to a point on one lateral end thereof, the bevels being adapted to corresponding bevels, $b$, of the toothed clutch D, which is pivoted in such position that its teeth will enter endwise between the teeth on the bar, and will force from between the bar-teeth any dust or trash which may have there lodged.

The toothed clutch D is adjustable, it being pivoted on the horizontal screw $e$, which has its bearings in a female screw provided in the sliding jaw $d$, as shown in Fig. 3. Its teeth are beveled at one end thereof to meet the aforementioned corresponding bevel provided in the serrated bar A, which causes the engaging teeth to slide together without biting. When the teeth are locked together they are retained in position by the flat spring $g$, which is rigidly secured to the jaw $d$ by screw $h$, as shown in Fig. 3. Hence it follows that when any object is pressed between the jaws $a$ and $d$ the lowering of the clutch D secures it and admits its being wrenched with great mechanical facility.

I am aware that a wrench has been constructed having the bar provided with saw-shaped teeth and with a pivoted clutch provided with saw-shaped teeth formed to clamp down and engage edgewise directly upon the bar-teeth. This I do not broadly claim.

What I claim, and desire to secure by Letters Patent, is—

In a wrench, the combination, with the bar A, having a stationary jaw, and provided on one edge with the teeth C, extending entirely across said edge, of the sliding jaw having the pivoted clutch D, provided with teeth arranged to enter endwise between the teeth of the bar when the clutch is closed, substantially as and for the purpose set forth.

In testimony whereof I affix my signature in presence of two witnesses.

PETER ROTERMUND.

Witnesses:
FRED. W. BELL,
W. R. FINCH.